(12) United States Patent
Min

(10) Patent No.: US 7,088,732 B2
(45) Date of Patent: Aug. 8, 2006

(54) APPARATUS AND METHODS FOR STORING AND COMPARING PIDS

(75) Inventor: Kyung-pa Min, Kyoungki-do (KR)

(73) Assignee: Hynix Semiconductor Inc., Kyoungki-do (KR)

( * ) Notice: Subject to any disclaimer, the term of this patent is extended or adjusted under 35 U.S.C. 154(b) by 1038 days.

(21) Appl. No.: 10/106,640

(22) Filed: Mar. 26, 2002

(65) Prior Publication Data

US 2002/0141432 A1    Oct. 3, 2002

(30) Foreign Application Priority Data

Mar. 27, 2001    (KR) ................. 2001-15913

(51) Int. Cl.
    H04L 12/28    (2006.01)
    H04L 12/54    (2006.01)
    H04L 12/56    (2006.01)

(52) U.S. Cl. .................. 370/428; 370/389; 370/392

(58) Field of Classification Search ........ 370/389–395, 370/474–487, 509–537; 709/220–223
    See application file for complete search history.

(56) References Cited

U.S. PATENT DOCUMENTS

| | | | |
|---|---|---|---|
| 5,331,628 A * | 7/1994 | Cheng et al. ............... | 370/248 |
| 5,517,250 A | 5/1996 | Hoogenboom et al. ..... | 348/467 |
| 5,652,749 A | 7/1997 | Davenport et al. ......... | 370/466 |
| 5,838,873 A | 11/1998 | Blatter et al. .................. | 386/95 |
| 5,917,830 A | 6/1999 | Chen et al. .................. | 370/487 |
| 5,920,572 A * | 7/1999 | Washington et al. ........ | 370/535 |
| 6,016,172 A * | 1/2000 | Huh ....................... | 375/240.27 |
| 6,201,815 B1 * | 3/2001 | Nomura ...................... | 370/429 |
| 6,438,145 B1 * | 8/2002 | Movshovich et al. ....... | 370/536 |
| 6,487,211 B1 * | 11/2002 | Yamaguchi ................. | 370/412 |
| 6,538,999 B1 * | 3/2003 | Sato .......................... | 370/252 |
| 6,621,817 B1 * | 9/2003 | Chauvel .................... | 370/389 |
| 6,654,423 B1 * | 11/2003 | Jeong et al. ........... | 375/240.29 |
| 6,996,101 B1 * | 2/2006 | Coupe et al. ............... | 370/389 |
| 2002/0064188 A1 * | 5/2002 | Mizobata .................... | 370/535 |
| 2004/0017821 A1 * | 1/2004 | Chauvel .................... | 370/428 |

FOREIGN PATENT DOCUMENTS

| | | |
|---|---|---|
| JP | 09-214951 | 8/1997 |
| JP | 10-075280 | 3/1998 |
| JP | 11-239186 | 8/1999 |
| JP | 11-239314 | 8/1999 |
| JP | 11-308580 | 11/1999 |
| JP | 2000-197020 | 7/2000 |

* cited by examiner

Primary Examiner—Man U. Phan
(74) Attorney, Agent, or Firm—Marshall, Gerstein & Borun LLP

(57) ABSTRACT

An apparatus for storing and comparing PIDs (Packet Identifiers) is disclosed which comprises a plurality of PID storing units for separately storing portions of PIDs in groups of 2 or more bits, a plurality of PID receiving and storing units for storing a PID of a current received packet, a plurality of comparing units for comparing the PIDs stored in the plurality of PID receiving and storing units with the PID stored in the plurality of PID storing units, and a control unit for determining whether comparison between the PID portions stored in the plurality of PID receiving and storing units and the PIDs stored in the plurality of PID storing unit are all matched and for generating a PID match signal or a PID mismatch signal.

16 Claims, 11 Drawing Sheets

FIG. 9

| PID LISTS | 0x0030, 0x0031, 0x0034, 0x003A<br>0x0040, 0x0041, 0x0044, 0x004A<br>0x1FFB, 0x1FF7, 0x1FF8, 0x1FF9, 0x1FFA, 0x1FFC, |
|---|---|

FIG. 10

| FIRST PID ADDRESS | FIRST PID VALUE |
|---|---|
| 0 | 0x01 |
| 1 | 0x02 |
| 2 | 0xFF |
| 3 | |
| ⋮ | ⋮ |
| 30 | |
| 31 | |

FIG. 11

| THIRD PID ADDRESS | COUNTER | ADDRESS | PID3 [4:0] |
|---|---|---|---|
| 0 | 3 | 0 | 0x10 |
| 1 | 3 | 1 | 0x00 |
| 2 | 5 | 2 | 0x1B |
| ⋮ | ⋮ | ⋮ | ⋮ |
| 30 | 0 | 0 | 0 |
| 31 | 0 | 0 | 0 |

FIG. 12

| FOURTH PID ADDRESS | Bit[14:10] | Bit[9:5] | Bit[4:0] |
|---|---|---|---|
| 0 | 0x1A | 0x14 | 0x11 |
| 1 | 0x1A | 0x14 | 0x11 |
| 2 | 0x19 | 0x18 | 0x17 |
| 3 | 0x00 | 0x0C | 0x1A |

⋮   ⋮   ⋮

FIG. 13 base_PID=PROGRAM NUMBER <<4 (pseudo C code)

| NAME | PID DEFINITION |
|---|---|
| PMT_PID | base_PID + 0x0000 |
| Video_PID | base_PID + 0x0001 |
| PCR_PID | base_PID + 0x0001 |
| Audio_PID | base_PID + 0x0004 |
| Data_PID | base_PID + 0x000A |

APPARATUS AND METHODS FOR STORING AND COMPARING PIDS

FIELD OF THE INVENTION

The present invention relates generally to digital television systems, and, more particularly to apparatus and methods for storing and comparing PIDs (Packet Identifiers).

DESCRIPTION OF THE PRIOR ART

An operation for storing and comparing PIDs, which will be described hereinafter, relates to ISO/IEC JIC1/SC29/WG11N0801 suggested by the moving picture experts group (MPEG) on Nov. 13, 1994 in Geneva, Switzerland. Concretely, it is to multiplex and demultiplex audio, video and additional data.

When digital data is received from a digital television system, a memory is needed for storing the packet identifier (PID) of audio data, video data or the like corresponding to each program for use in performing demultiplexing to achieve multi decoding. Typically the decoding speed is decreased in the system demultiplexer because a lot of time is required in comparing PIDs of a current received packet to the universe of expected (possible) PIDs. Also, there is a problem in that a mass-storage buffer is needed in order to improve the decreased decoding speed. Particularly, since the number of programs received from one channel gradually increases and qualities of audio, video or the like in each program become higher, such a problem becomes serious.

FIG. 1 is a diagram illustrating a standard of a conventional transport packet. All video, audio and additional data are transmitted in the form of packets.

An MPEG-2 standard represents transmission of the packet containing digital information of several sources and, in MPEG-2 system, a transport stream is made up of a contiguous set of fixed length packets. Each packet is a total of 188 bytes in length. 4 bytes therein are assigned as a packet header. The PID is assigned 13 bits in the header of each packet. Also, the MPEG-2 standard permits several mixed programs to be transmitted in one physical channel. At this time, each of audio, video and additional data related to each program uses a different PID.

FIG. 2 is a block diagram illustrating a conventional MPEG-2 system. A synchronous signal detecting and PID extracting unit 210 extracts the 13-bit PID of a current received packet and stores the 13-bit PID. A PID storing unit 220 stores 32 PIDs which a system demultiplexer may receive. A comparing unit 230 reads out the 32 PIDs from the PID storing unit 220 one by one and sequentially compares the PIDs which are extracted by the synchronous signal detecting and PID extracting unit 210 to the read out PIDs. A demultiplexer (DEMUX), in a MPEG-2 system, including the synchronous signal detecting and PID extracting unit 210, the PID storing unit 220, the comparing unit 230 and a transport packet and packetized elementary stream (PES) packet parser 240 determines kinds of data, such as audio, video and additional data of one program, and processes each type of the data. At this time, packets including information of audio, video and/or additional data which belong to different (e.g., non-tuned) programs are dropped.

FIG. 3 is a diagram illustrating in detail the synchronous signal detecting and PID extracting unit 210, the PID storing unit 220 and the comparing unit 230 of FIG. 2. The synchronous signal detecting and PID extracting unit 310 extracts the PID from a current received packet and stores the same therein. For example, the PID storing unit 320 stores thirty-two 13-bit PIDs which the system demultiplexer may receive. The comparing unit 330 compares a 13-bit PID of the current received packet read out from the synchronous signal detecting and PID detecting unit 310 with each 13-bit PID stored in the PID storing unit one by one from address "0" and then determines whether the comparison result is matched or mismatched.

FIG. 4 is a flow chart showing the process of comparing PIDs used by the apparatus shown in FIG. 3. The PIDs are set in a memory or a registry at block 420. The PIDs are extracted one by one from a received packet at block 430 and the PIDs are compared with PIDs stored in the PID storing unit 320 20 by reading out the PIDs one by one (step 440). The comparing unit 330 compares the PID from the current received packet with the current read out PID from the memory at block 450. In the comparing unit 330, if a PID of the current received packet and a PID retrieved from memory are not matched, it is determined whether the current address is the last memory address or not. If the address is not the last address, the memory address is increased by one at block 460 and the next PID is retrieved. If the PIDs are still not matched after the last PID address (address "31") is retrieved, a PID mismatch signal is generated at block 470 and a new packet is received for analysis. In the comparing unit 330, if the PID of the current received packet and any one of the loaded PIDs match each other, a PID match signal is generated in order to accept the packet at block 480. After generating the PID match signal, the received packet is demultiplexed at block 490 and a new packet of 188 bytes is received for processing.

However, the decoding speed in the system demultiplexer is decreased because a lot of time is required to compare the received current PID with all the possible PIDs located in memory.

SUMMARY OF THE INVENTION

In accordance with an aspect of the invention, an apparatus is provided for storing and comparing PIDs. The apparatus includes at least two PID stores for separately storing first and second portions of possible PIDs. Each of the first and second portions include at least two bits. The apparatus also includes a plurality of PID receiving and storing units to store at least first and second portions of a current PID of a current received packet; a first comparing unit to compare the first portion of the current PID with the first portion of the possible PIDs stored in the plurality of PID stores; and a second comparing unit to compare the second portion of the current PID with the second portion of the possible PIDs stored in the plurality of PID stores. The apparatus also includes a control unit for generating a match signal if the first portion of the current PID matches the first portion of one of the possible PIDs and the second portion of the current PID matches the second portion of one of the possible PIDs.

In accordance with another aspect of the invention, an apparatus is provided for storing and comparing PIDs. The apparatus includes first PID storing means for storing a first part of each expected PID, and second PID storing means for storing a second part of each expected PID. The first parts and second parts are mutually exclusive. The apparatus also includes first PID receiving and storing means for storing a first part of a current PID of a current received packet; second PID receiving and storing means for storing a second part of the current PID; first comparing means for comparing the first part of the current PID with the first part of an expected PID; and second comparing means for comparing the second part of the current PID with the second part of an expected PID. In addition, the apparatus is provided with controlling means for generating a match signal if (a) a match has occurred between the first part of the current PID and the first part of one of the expected PIDs, and (b) a match has occurred between the second part of the current PID and the second part of one of the expected PIDs.

In accordance with still another aspect of the invention, a method is provided for storing and comparing PIDs. The method includes the steps of: a) storing a first part of each expected PID; b) storing a second part of each expected PID separately from the first part of each expected PID; c) storing a first part of a current PID of a current received packet; d) storing a second part of the current PID of the current received packet; e) sequentially comparing the first parts of the current PID to the first part of the expected PIDs until a match occurs or each of the first parts of the expected PIDs have been compared with no resulting match; f) sequentially comparing the second parts of the current PID to the second part of the expected PIDs until a match occurs or each of the second parts of the expected PIDs have been compared with no resulting match; g) determining whether (1) a match has occurred between the first part of the current PID and one of the first parts of the expected PIDs, and (2) a match has occurred between the second part of the current PID and one of the second parts of the expected PIDs; and h) generating a control signal indicative of the determination made in step (g).

In accordance with yet another aspect of the invention, a method is provided for storing and comparing PIDs. The method includes the steps of: a) storing expected PIDs by segmenting each of the expected PIDs into at least two segments, each of the at least two segments having at least two bits; b) storing a current PID of a current received packet; c) sequentially comparing a first part of the current PID with a first one of the at least two segments of the expected PIDs until a match is found or until all of the expected PIDs are checked without a match occurring; d) sequentially comparing a second part of the current PID with a second one of the at least two segments of the expected PIDs until a match is found or until the expected PIDs are checked without a match occurring; and e) determining whether steps c) and d) have both resulted in a match.

BRIEF DESCRIPTION OF THE DRAWINGS

FIG. 9 is a diagram showing a PID list to be checked.

FIG. 10 is a diagram showing storage of a first PID.

FIG. 11 is a diagram showing storage of a third PID.

FIG. 12 is a diagram showing storage of a fourth PID.

FIG. 13 is a diagram showing an example of the PID standard according to the U.S. ATSC (Advanced Television Systems committee) standard.

DETAILED DESCRIPTION OF THE PREFERRED EMBODIMENTS

Hereinafter, an apparatus constructed in accordance with the teachings of the invention for high-speed detection of a PID (Packet Identifier) will be described in detail with reference to the accompanying drawings.

Figure 1:
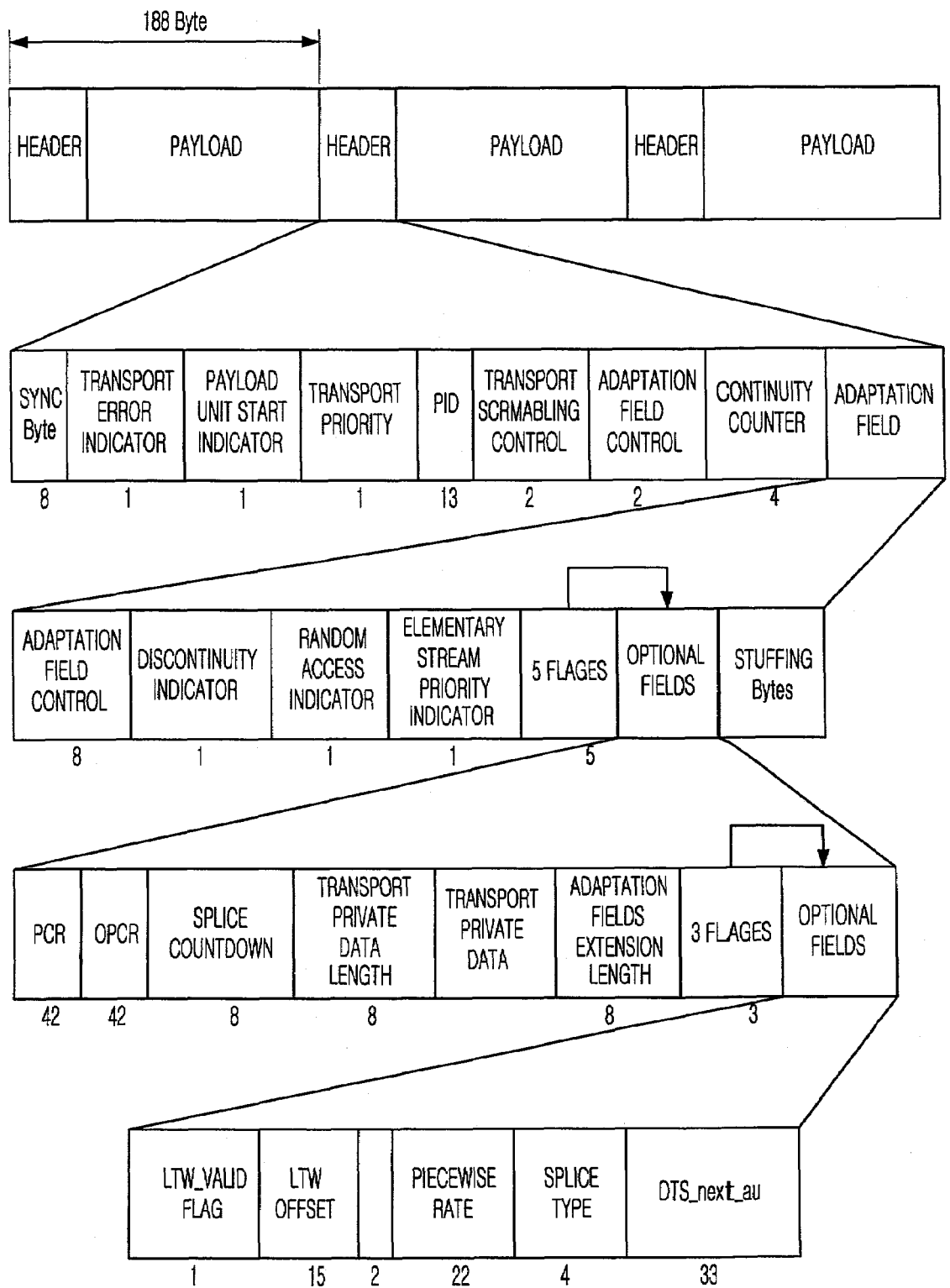
FIG. 1 is a diagram showing a conventional transport packet.
Figure 2:
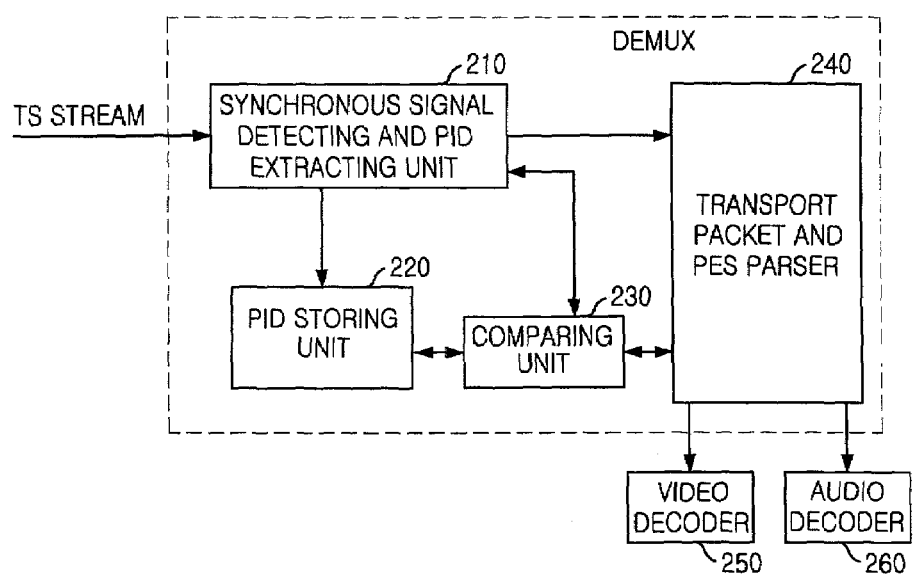
FIG. 2 is a block diagram illustrating a conventional MPEG-2 system.
Figure 3:
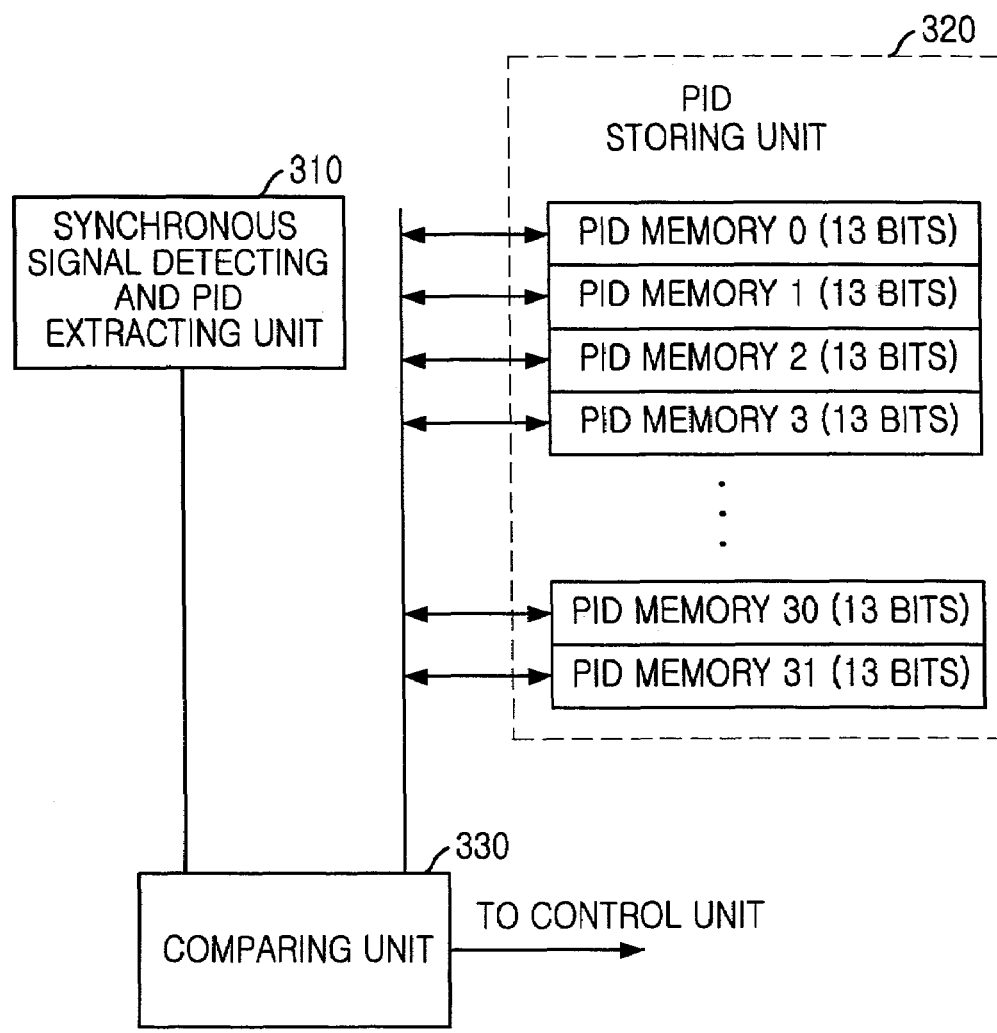
FIG. 3 is a diagram illustrating in detail the synchronous signal detecting and PID extracting unit, the PID storing unit and the comparing unit of FIG. 2.
Figure 4:
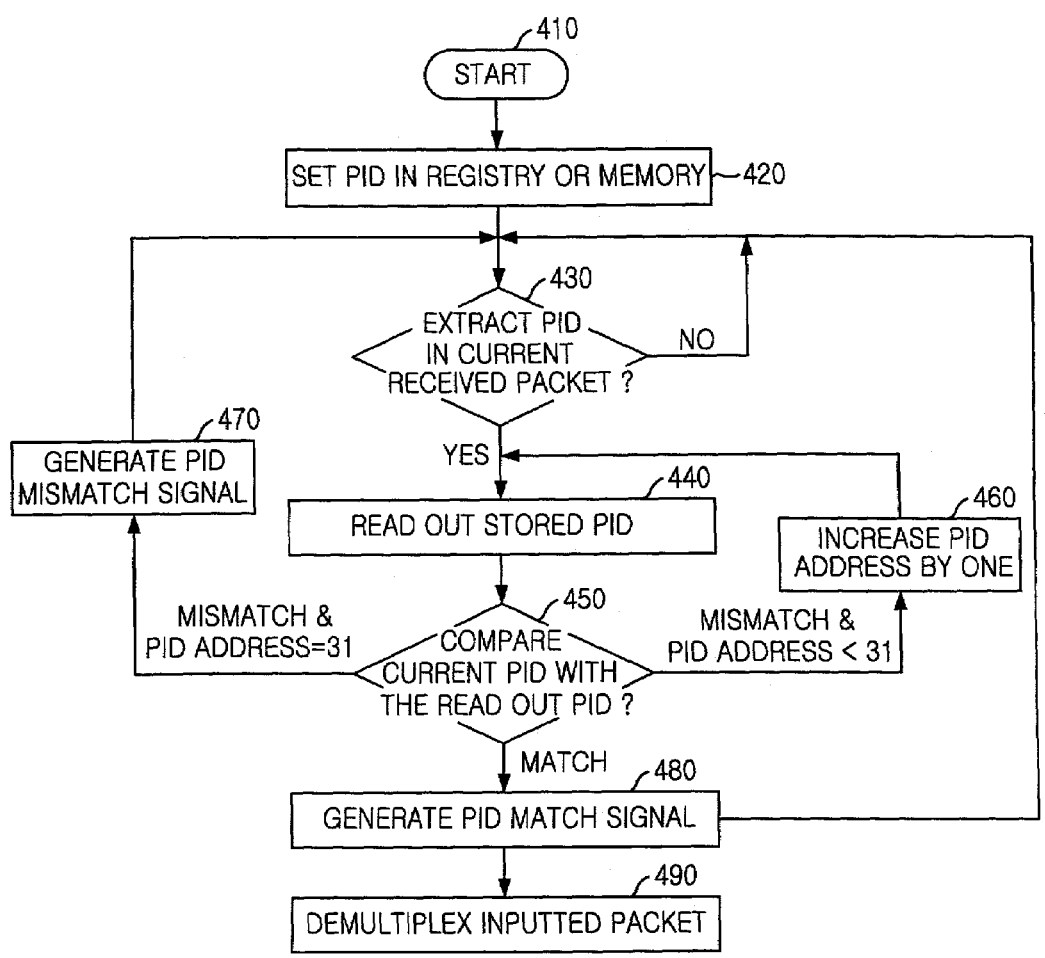
FIG. 4 is a flow chart illustrating the prior art methodology for comparing PIDs.
Figure 5:
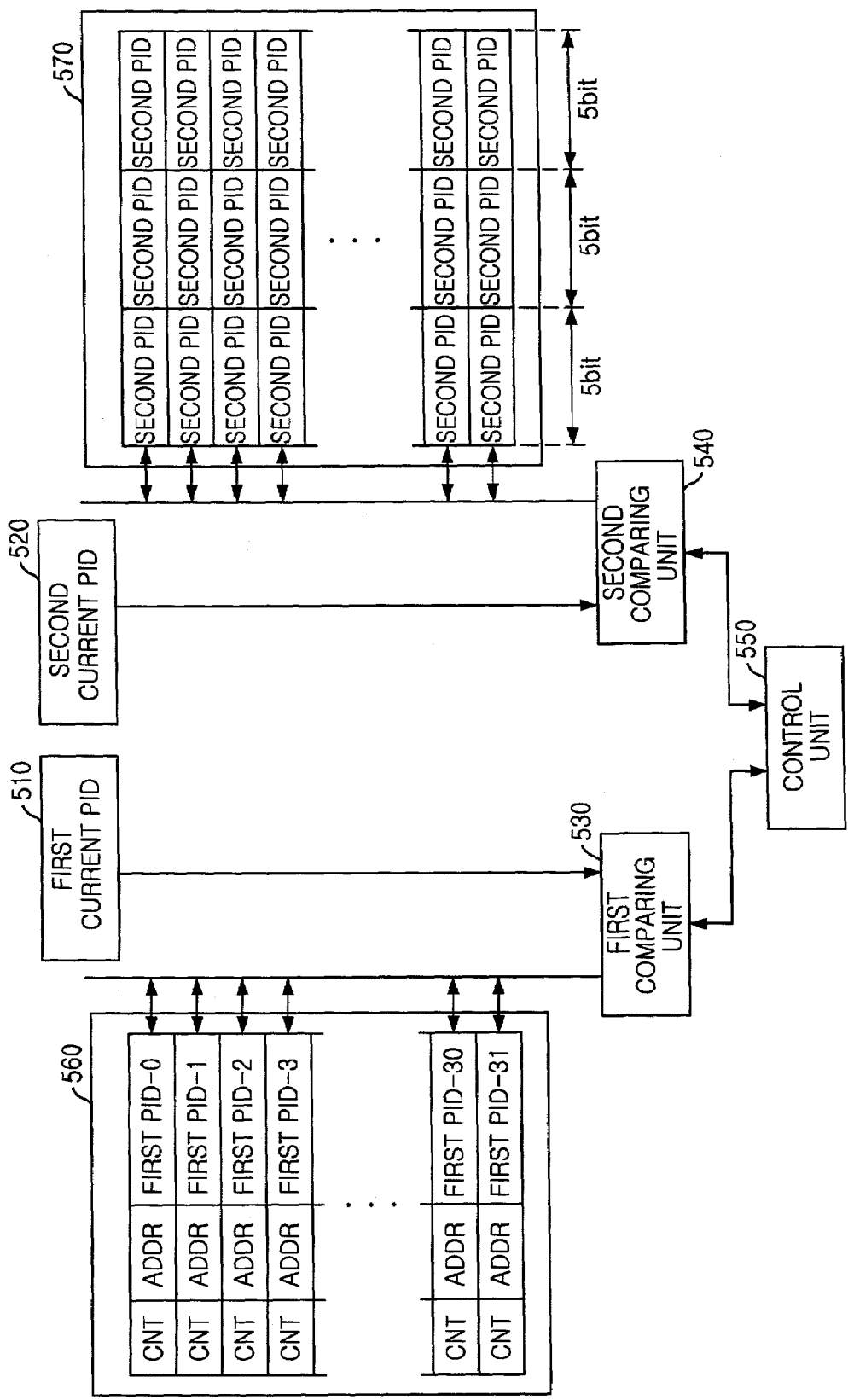
FIG. 5 is a diagram showing an exemplary system constructed in accordance with the teachings of the invention for hierarchical storage and comparison of PIDs.

FIG. 5 is a diagram showing an exemplary system for hierarchical storage and comparison of a PID. The PID (having the 13 bits in total) is divided into two parts and these parts are separately processed. A first part of each possible PID is made up of 8 bits and this 8-bit PID is placed in a first storage device. A second part of each possible PID is made up of 5 bits and this 5-bit PID is placed in a second storage device. In the same manner, a received current PID of 13 bits is also divided into two parts (one of 8 bits and one of 5 bits). A comparison of the two parts of the PID is simultaneously performed in parallel on the same sequence of bits. Further, the second part is also optionally divided into several subparts.

Referring again to FIG. 5, a first PID receiving and storing unit 510 stores a PID corresponding to bits [12:5] (hereinafter, referred to as a first current PID). This nomenclature means 8 bits from the fifth bit to the twelfth bit in a PID bit stream of the packet are placed in the first current PID. This portion of the PID [12:5] has information about a program in a current received packet. A second PID receiving and storing unit 520 stores bits [4:0] (hereinafter, referred to as a second current PID). This portion [4:0] of the PID has information about data in each program of the current received packet. Also, a first PID storing unit 560 has a counter field and an address field for each address. This unit 560 functions as a first indexing unit identifying PIDs corresponding to the possible [12:5] bits (hereinafter, referred to as a first PID), which have the same location as the first current PID stored in the first PID receiving and storing unit 510. A second PID storing unit 570 stores PIDs corresponding to the possible [4:0] bits (hereinafter, referred to as a second PID), which have the same location as the second current PID stored 20 in the second PID receiving and storing unit 520.

A first comparing unit 530 reads out the first current PID of the current received packet from the first PID receiving and storing unit 510 and sequentially compares the first current PID of the current received packet in the first PID receiving and storing unit 510 with the first PIDs stored in the first PID storing unit 560. The comparison results are delivered to a control unit 550. Also, a second comparing unit 540 reads out the second current PID of the current received packet and sequentially compares the second current PID of the current received packet PID with the second PIDs stored in the second PID storing unit 570. The comparison results are provided to the control unit 550.

The control unit 550 controls the first comparing unit 530 and the second comparing unit 540 and determines if the comparisons between the PIDs of the current received packet and the PIDs stored in the PID storing units 530 and 540 have resulted in a match based upon the comparison results in the first comparing unit 530 and the second comparing unit 540. If the comparison result between the current PIDs and the stored PIDs is matched, a PID match signal is generated and if not, a PID mismatch signal is generated.

Figure 6:
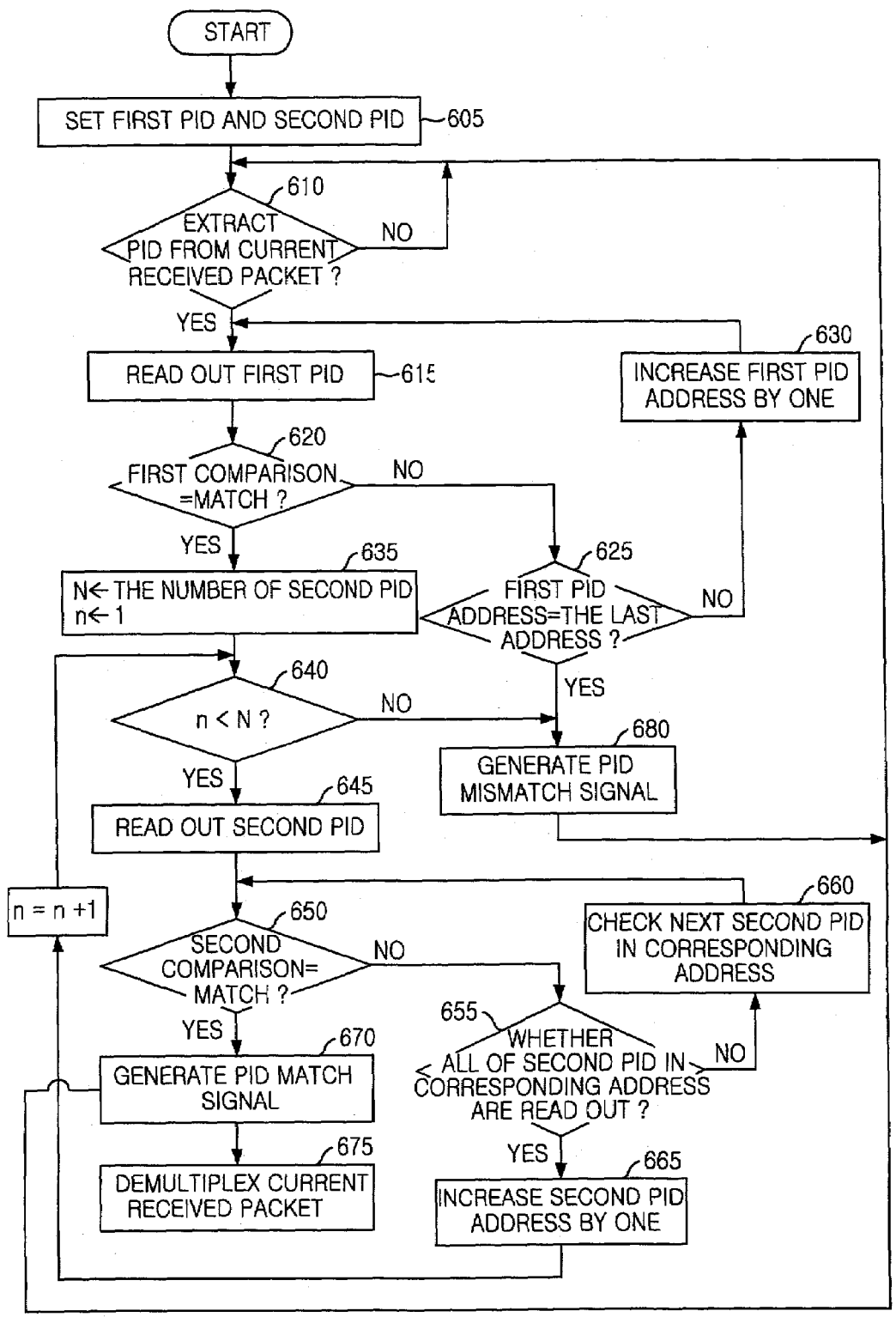
FIG. 6 is a flow chart illustrating the operation of the system of FIG. 5.

FIG. 6 is a flow chart illustrating the operation of the system of FIG. 5 in more detail. All expected instances of the first PID and the second PID are set in a register or a memory at block 605. The current PID is extracted from a current received packet at block 610. The first comparing unit 530 reads out the first PIDs one by one by starting from the first PIDs stored in an address "0" of the first PID storing unit 560 and compares the first current PID of the current received packet with the first PIDs one by one (blocks 615–630). The number and address of the second PID related to the first PID are pre-stored in the counter field and the address field of the first PID. The number and address of the second PID related to the first PID are respectively read out at the same time as the first PID for identifying addresses in the second PID storing unit 570 where the data information for each program is stored. This will be more concretely explained below.

The first PID of the first PID storing unit 560 is read out. If the comparing unit 530 determines that the first current PID of the current received packet and the selected first PID are not matched (block 620), the comparing unit 530 sequentially increases the address of the first PID by one (block 630) and performs another comparison (blocks 615, 620) until a final address of the first PID becomes the last address (block 625) or until a match occurs (block 620). If the comparison result in the first comparison unit 530 between the first current PID of the current received packet and the read-out first PID is not matched even after the address of the first PID becomes the last address, a PID mismatch signal is generated at block 680.

Meanwhile, when the comparison result from the first comparing unit 530 is matched, if the number of second PIDs related to the counter field information associated with the corresponding first PID is N, the second comparing unit 540 repeatedly reads out the second PIDs the maximum N times and performs the second comparison at block 640, 645, 650, 660 and 665. Namely, one second PID is read out and the read-out second PID and the second current PID of the current received packet are compared in the second comparing unit 540 at block 650. If the comparison result is not matched, a determination is performed whether all second PIDs in the corresponding address are read out at block 655.

If all second PIDs in the corresponding address are not read out, the second comparison is again performed by checking the next second PID in the corresponding address at block 660. If all of the second PIDs in the corresponding address are read out in order and no match occurs (block 655), the second PIDs stored in the next address related to the first PID are read out by increasing the address by one at block 665.

When all of the read-out second PIDs related to the matched first PIDs in the first comparing unit 530 are compared with the second current PIDs of the current received packet at block 640 and they are still not matched, the PID mismatch signal is generated at block 680. In the second comparison result in the second comparing unit 540, if the read-out second PIDs and the second current PID of the current received packet are matched, the PID match signal is generated at block 670 and the current received packet is demultiplexed at block 675. A new packet is received after the PID match signal is generated at block 670 or the PID mismatch signal is generated at block 680.

Figure 7:
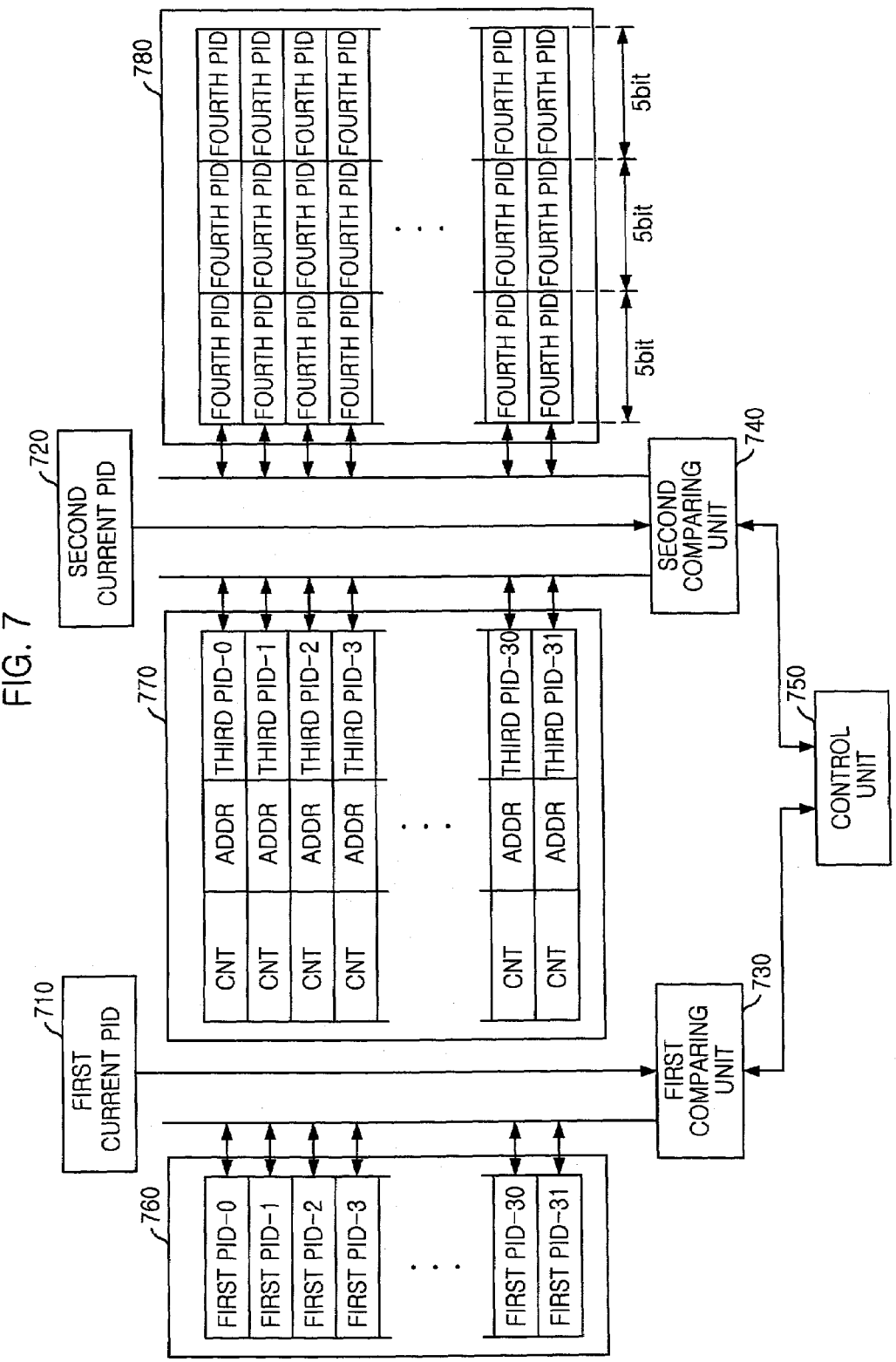
FIG. 7 is a diagram showing another exemplary system constructed in accordance with the teachings of the invention for hierarchical storage and comparison of PIDs.

FIG. 7 is a diagram illustrating a second exemplary system for hierarchical storage and comparison of the PID. In this example, the second PIDs of the first example (FIGS. 5–6) are each separated into a third PID and a fourth PID, which are stored in a third PID storing unit 770 and a fourth PID storing unit 780, respectively. The third PID storing unit 770 stores the most frequently received data. For example, the third PID storing unit 770 stores the third PID, which is a part of the video data. The fourth PID storing unit 780 stores the fourth PIDs which include all of the PIDs that are not stored in the first PID storing unit 760 or the third PID storing unit 770. Namely, the fourth PID storing unit 780 stores fourth PIDs which are a part of PIDs of the audio data and additional data. The reason that the PIDs are hierarchically stored (e.g., split into two groups, namely third PIDs and fourth PIDs), is to improve detecting speed of PIDs by storing specific parts representing video data in the third PID storing unit 770 and by storing bits representing the rest of the data in the fourth PID storing unit 780 in order to firstly compare the video data because the video data is most frequently received among the group of video data, audio data and additional data which together usually form one program.

A first comparing unit 730 compares the first current PID of a current received packet from a first PID receiving and storing unit 710 with the first PIDs stored in the first PID storing unit 760 and provides the comparison result to a control unit 750. A second comparing unit 740 compares the second current PID of a current received packet from a second receiving PID storing unit 720 with the third PIDs stored in the third PID storing unit 770. If none of the third PIDs match the second current PID, the second comparing unit 740 compares the second current PID of the current received packet with the fourth PIDs stored in the fourth comparable PID storing unit 780 and provides the comparison result to the control unit 750.

The control unit 750 analyzes a counter field and an address field of the third PID storing unit 770 and determines whether the comparison between the current received PID and the read-out PIDs is continuously carried out or not according to the comparison result of the first comparing unit 730 and the second comparing unit 740. After the comparison is completed, a PID match signal or a PID mismatch signal is generated as appropriate.

Figure 8:
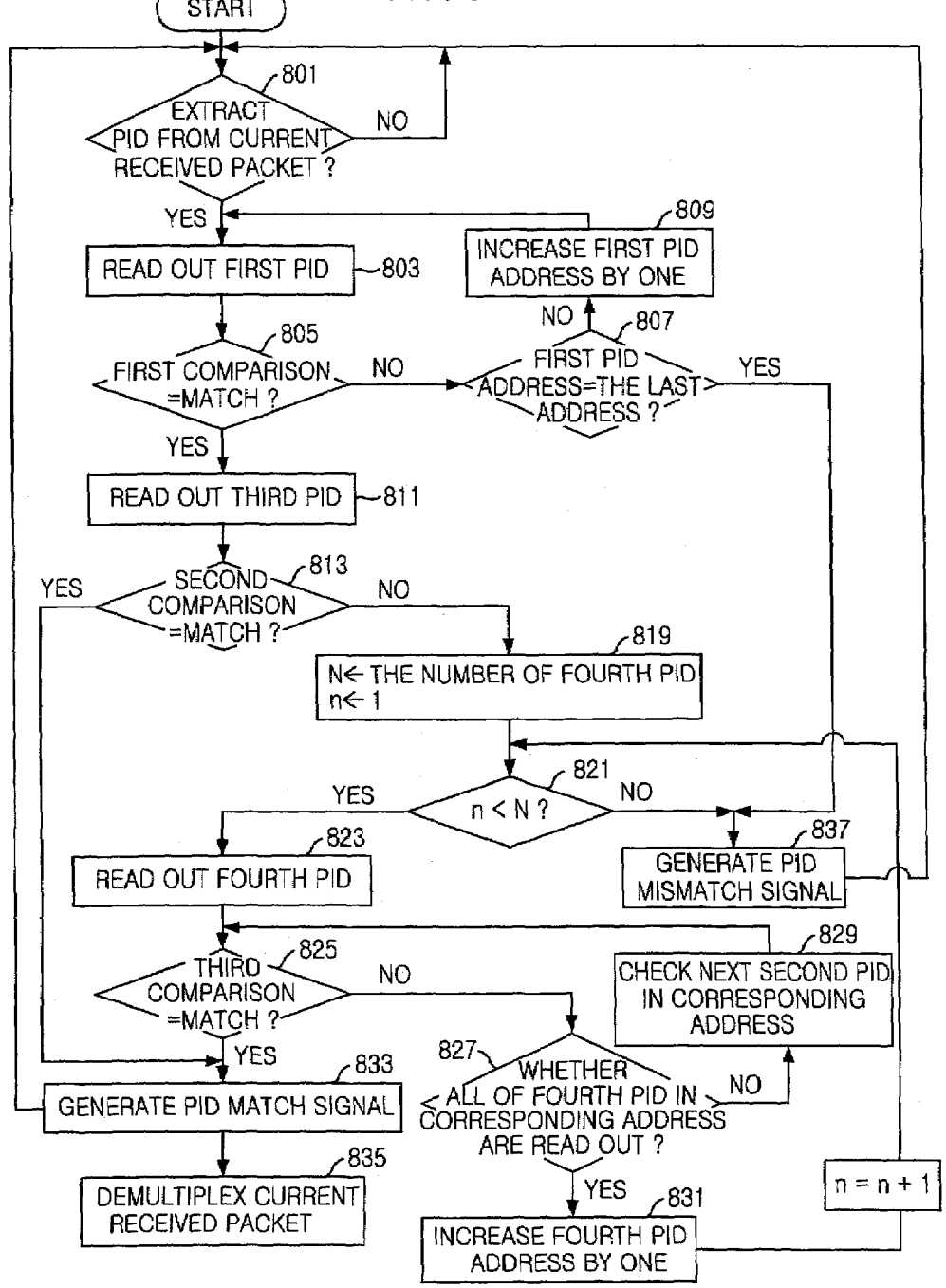
FIG. 8 is a flow chart illustrating the operation of the system of FIG. 7.

FIG. 8 is a flow chart illustrating the operation of the system of FIG. 7 in more detail. The expected set of first PIDs, third PIDs and fourth PIDs are stored in each registry and memory. A PID is extracted from a current received packet at block 801. The first PIDs are read out one by one starting with the first PID stored in an address "0" of the first PID storing unit 760 at block 803. The first comparing unit 730 performs a first comparison between the first current PID of the current received packet and the first PIDs stored in the first comparing PID storing unit 760 at block 805. If the first current PID of the current received packet and the first PID stored in the first PID storing 760 are not matched (block 805), the first comparison is carried out by increasing the address of the first PIDs by one at block 809 until the first PID address becomes the last address at block 807 or a match occurs. If the address of the first PID becomes the last address and the comparison result is still not matched (block 807), a PID mismatch signal is generated at block 837.

If the first current PID of the current received packet and one of the first PIDs stored in the first PID storing unit 760 are matched, the second comparing unit 740 reads out the third PIDs one by one starting with the third PID stored in address "0" of the third PID storing unit 770 (block 811). It then compares the second current PID of the current received packet with the third PIDs one by one (block 813).

The number and address of the fourth PIDs are stored in the counter field and the address field of related third PIDs. This data is read out one by one at the same time as the third PIDs so that the number of PIDs for data (not including PIDs for video data) in each program is known and the addresses of the known PIDs in the fourth PID storing unit 780 are identified.

Namely, the third PIDs stored in the third PID storing unit are read out one by one at block 811. If the second current PID of the current received packet and the read-out third PID are matched, a PID match signal is generated at block 833. When the second current PID of the current received packet and the read-out third PID are not matched, the controller 740 analyzes the counter field and the address field of the third PID storing device to detect the fourth PIDs related to the third PID stored in the third PID storing device. If the number of fourth PIDs stored in the fourth PID storing device, which are related to the counter field information stored in the third PID storing device, is N, the second comparing unit 740 determines whether the second current PID of the current received packet and the read-out fourth PID are matched by reading out the fourth PIDs one by one up to the maximum N times at blocks 821, 823, 825, 827, 829 and 831. The second comparing unit 740 reads out the fourth PIDs at block 823. The read-out fourth PID and the second current PID of the current received packet are compared to determine whether they are matched at block 825. If the read-out fourth PID and the second current PID of the current received packet are not matched (block 825), the control unit 750 determines whether all of fourth PIDs in the corresponding address have been read out at block 827. If all of the fourth PIDs in the corresponding address have not been read out, a third comparison is carried out by checking the next fourth PID in the corresponding address at block 829. When all of the fourth PIDs in the corresponding address have been read out, the fourth PID stored in the next address are read out by increasing the address of the fourth PID by one (block 831).

If after all of the fourth PIDs related to the third PIDs matched in the second comparing unit 740 are compared with the second current PID of the current received packet and there is still no match, a PID mismatch signal is generated at block 837. If the second comparison result in the second comparing unit 740 is matched and the third comparison in the second comparing unit 740 is matched, a PID match signal is generated at block 833 and the current received packet is demultiplexed at block 835. A new packet is received after the generation of the PID match signal at block 833 and the generation of the mismatch signal at block 837.

FIG. 9 is a diagram showing an exemplary PID lists to be checked. Namely, 0x0030, 0x0031, 0x0034 and 0x003A are a PID list of a first program and 0x0040, 0x0041, 0x0041, 0x0044 and 0x004A are a PID list of a second program. Herein, 0x means hexadecimal number.

FIG. 10 is a diagram illustrating storage of the first PIDs. A part of the bit streams ([12:5] bits) of PIDs capable of identifying each program are stored in each address in a registry.

FIG. 11 is a diagram illustrating storage of the third PIDs. A part of the bit streams ([4:0] bits) of PIDs, which are the video data in each program, are stored in each address of a registry. Here, the figures in the counter field represent the number of PIDs of the audio data and additional data stored in the fourth PID storing unit 780 related with PIDs for the video data. Also, the figures in the address field, represent addresses of PIDs of the audio and additional data in the fourth PID storing unit 780. For example, when the address of the third PID is "0", the number of PIDs in the first program PID list is four in FIG. 9. Since the number of PIDs of the remaining data (excluding the PIDs of the video data stored in the third PID storing unit 770) is three, the figure "3" is written in the counter field. Since the audio and additional data (excluding the video data) are written at address 0 in the fourth PID storing unit 780, the figure "0" is written in the address field.

FIG. 12 is a diagram illustrating storage of the fourth PID. A part of the bit stream ([4:0] bits) of PIDs of the audio and additional data in each program is stored in each address of the registry.

FIG. 13 is a diagram showing an example of a PID standard according to the U.S. ATSC (Advanced Television Systems committee) standard. The ATSC is the U.S. standards of service information or program information in digital broadcasting. On the other hand, the European way is a DVB (Digital Video Broadcasting) standard. Also, a PMT is a program map table and a PCR is a program clock reference.

The 13-bit PIDs are hierarchically separated with two parts, one of eight bits and one of five bits in the example of FIGS. 5–6. The five bits of the PID are stored as separated with frequently received data and not frequently received data in the example of FIGS. 7–8. The bit division of the 13-bit PIDs may not be restricted to specific numbers of bits, such as eight and five bit division or nine and four bit division. Namely, the number of the separated bits is changeable by a standard of digital broadcasting of each country and by how the PIDs of the data of video, audio and additional information data consisting of a program is made. Also, the number of the separated bits is changeable according to a characteristic the most frequently used together in the 13-bit PID in multi-decoding.

Accordingly, even if a small PID memory region is used, a lot of PIDs can be detected. When one packet is received, comparison time of PIDs is decreased and the decoding speed is improved. Also, the size of the receiving buffer is reduced.

From the foregoing, persons of ordinary skill in the art will appreciate that apparatus and methods have been disclosed for storing and comparing PIDs with high-speed detection.

As will be appreciated by persons of ordinary skill in the art, the disclosed apparatus and methods rapidly detect the PID of a current received packet in performing multi-decoding in an MPEG-2 system. The 13-bit PID is divided into two parts, namely, an 8-bit PID and a 5-bit PID to rapidly identify the PID. Generally, the 8-bit PID (PID[12: 5]) has program information and the 5-bit PID (PID[4:0]) has information of data, such as video data, audio data and additional data. The 8-bit PID usually acts as an indexing PID.

This operation can be more easily understood with reference to FIG. 9 which shows exemplary PID lists, which have program and data information. In FIG. 9, 0x0030, 0x0031, 0x0034 and 0x003A represent a PID list of a first program and 0x0040, 0x0041, 0x0044 and 0x004A represent a PID list of a second program. Hereinafter, for example, a PID comparison of the first program will be explained.

If converting PIDs, 0x0030, 0x0031, 0x0034 and 0x003A of hexadecimal numbers into binary numbers, they become 0000000000110000, 0000000000110001, 0000000000110100 and 0000000000111010. The 1st to 3rd binary values from the left of each PID are deleted to satisfy 13 bits of a PID, so that the PIDs of the binary numbers become 0000000110000, 0000000110001, 0000000110100 and 0000000111010. At this time, the 8-bit PID, which is 6th to 13th binary values of each PID from right (i.e., '00000001'), is stored in a first PID storing device. The '00000001' becomes '0x01' in a hexadecimal number and the '0x01' is stored at an address '0' memory or register of the first PID storing device as shown in FIG. 10.

Among 0000000110000, 0000000110001, 0000000110100 and 0000000111010, the PID '0000000110000,' which is first received, usually represents a PID of video data most frequently received, so that the 1st to 5th binary values of the PID '0000000110000' from right (i.e., '10000'), is stored in a third PID storing device. The '10000' becomes '0x10' in a hexadecimal number and the '0x10' is stored in a memory of register corresponding to an address '0' of the third PID storing device as shown in FIG. 11.

Meanwhile, the PIDs '0000000110001, 0000000110100 and 0000000111010' usually correspond to the audio data or additional data. '10001,' '10100' and '11010,' which are 1st to 5th binary values of the PIDs '0000000110001, 0000000110100 and 0000000111010' except the PID '0000000110000' stored in the third PID storing device, are stored in a memory or register of a fourth PID storing device, respectively. The '10001,' '10100' and '11010' becomes '0x11,' '0x14' and '0x1A' in hexadecimal numbers and the '0x11,' '0x14' and '0x1A' are stored in a memory or register corresponding to an address '0' of the fourth PID storing device as shown in FIG. 12.

Also, the third PID storing device has a counter field and address field. The counter field and the address field are set capable of determining how many and where the fourth PIDs (which have a relationship with the third PID), are in the fourth PID storing device. Namely, for example, the number '3' stored at the first counter field in FIG. 11 represents the number of fourth PIDs '0x11,' '0x14' and '0x1A' related to the third PID '0x10 ' stored in the third PID storing device and information of the memory or register address of '0x11,' '0x14' and '0x1A' is stored in an address field of the third PID storing device. A control unit 750 in FIG. 7 analyzes the address field and the counter field of the third PID storing device to perform a comparison between the second PID (PID[4:0]) of the current received packet and the fourth PIDs stored in the fourth PID storage device.

Although certain apparatus constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. An apparatus for storing and comparing PIDs comprising:
    at least two PID stores for separately storing first and second portions of possible PIDs, each of the first and second portions including at least two bits;
    a plurality of PID receiving and storing units to store at least first and second portions of a current PID of a current received packet;
    a first comparing unit to compare the first portion of the current PID with the first portion of the possible PIDs stored in the plurality of PID stores;
    a second comparing unit to compare the second portion of the current PID with the second portion of the possible PIDs stored in the plurality of PID stores; and
    a control unit for generating a match signal if the first portion of the current PID matches the first portion of one of the possible PIDs and the second portion of the current PID matches the second portion of one of the possible PIDs.

2. An apparatus for storing and comparing PIDs comprising:
    first PID storing means for storing a first part of each expected PID;
    second PID storing means for storing a second part of each expected PID, the first parts and second parts being mutually exclusive;
    first PID receiving and storing means for storing a first part of a current PID of a current received packet;
    second PID receiving and storing means for storing a second part of the current PID;
    first comparing means for comparing the first part of the current PID with the first part of an expected PID;
    second comparing means for comparing the second part of the current PID with the second part of an expected PID; and
    controlling means for generating a match signal if (a) a match has occurred between the first part of the current PID and the first part of one of the expected PIDs, and (b) a match has occurred between the second part of the current PID and the second part of one of the expected PIDs.

3. An apparatus as defined in claim 2, wherein the second parts of the expected PIDs comprise a third expected PID and a fourth expected PID, and wherein the second PID storing means includes:
    a third PID storing means for storing the third PID; and
    a fourth PID storing means for storing the fourth PID.

4. An apparatus as defined in claim 3, wherein the third PID stores bits for video data.

5. An apparatus as defined in claim 4, wherein the second comparing means selectively reads out PIDs stored in the first PID receiving and storing means and PIDs stored in the third PID receiving storing means.

6. An apparatus as defined in claim 5, wherein the second comparing means selectively reads out PIDs stored in the first PID receiving and storing means and PIDs stored in the fourth PID receiving and storing means.

7. An apparatus as defined in claim 6, wherein the first part of each expected PID stored in the first PID receiving and storing means includes bits from the Most Significant Bit to the eighth bit.

8. An apparatus as defined in claim 7, wherein each of the first PID storing means, the second PID storing means, the first PID receiving and storing means and the second PID receiving and storing means is a register.

9. An apparatus as defined in claim 7, wherein each of the first PID storing means, the second PID storing means, the first PID receiving and storing means and the second PID receiving and storing means is a memory.

10. A method for storing and comparing PIDs, comprising:
    a) storing a first part of each expected PID;
    b) storing a second part of each expected PID separately from the first part of each expected PID;
    c) storing a first part of a current PID of a current received packet;
    d) storing a second part of the current PID of the current received packet;

e) sequentially comparing the first part of the current PID to the first parts of the expected PIDs until a match occurs or each of the first parts of the expected PIDs have been compared with no resulting match;

f) sequentially comparing the second part of the current PID to the second parts of the expected PIDs until a match occurs or each of the second parts of the expected PIDs have been compared with no resulting match;

g) determining whether (1) a match has occurred between the first part of the current PID and one of the first parts of the expected PIDs, and (2) a match has occurred between the second part of the current PID and one of the second parts of the expected PIDs; and h) generating a control signal indicative of the determination made in step (g).

11. A method as defined in claim 10, wherein step d) is performed by:

separately storing the second parts of each of the expected PIDs as a third part of the expected PID and a fourth part of the expected PID.

12. A method as defined in claim 11, wherein the third parts of the expected PIDs contain bits representing video data.

13. A method as defined in claim 12, wherein step f) includes comparing the second part of the current PID with at least one of the third parts of the expected PIDs.

14. A method as defined in claim 12, wherein step f) includes comparing the second part of the current PID with at least one of the fourth parts of the expected PIDs.

15. A method for storing and comparing PIDs, comprising:

a) storing expected PIDs by segmenting each of the expected PIDs into at least two segments, each of the at least two segments having at least two bits;

b) storing a current PID of a current received packet;

c) sequentially comparing a first part of the current PID with a first one of the at least two segments of the expected PIDs until a match is found or until all of the expected PIDs are checked without a match occurring;

d) sequentially comparing a second part of the current PID with a second one of the at least two segments of the expected PIDs until a match is found or until the expected PIDs are checked without a match occurring; and e) determining whether steps c) and d) have both resulted in a match.

16. A method as defined in claim 15 further comprising:

f) determining if step c) and step d) have resulted in matches of corresponding ones of the at least two segments.

* * * * *